United States Patent [19]
Ohta

[11] Patent Number: 5,713,808
[45] Date of Patent: Feb. 3, 1998

[54] AUTO-TENSIONER

[75] Inventor: Hideyuki Ohta, Yao, Japan

[73] Assignee: Koyo Seiko Co., Ltd., Osaka, Japan

[21] Appl. No.: 658,586

[22] Filed: Jun. 5, 1996

[51] Int. Cl.$^6$ .................................................. F16H 55/36
[52] U.S. Cl. ............................ 474/94; 474/112; 474/135
[58] Field of Search .......................... 474/94, 101, 110, 474/112, 135

[56] References Cited

U.S. PATENT DOCUMENTS

| | | | |
|---|---|---|---|
| 4,834,694 | 5/1989 | Martin | 474/135 |
| 4,917,655 | 4/1990 | Martin | 474/135 X |
| 4,934,988 | 6/1990 | Kawamura et al. | |
| 5,073,148 | 12/1991 | Dec | |
| 5,186,689 | 2/1993 | Yamamoto et al. | 474/112 |
| 5,370,585 | 12/1994 | Thomey et al. | 474/112 |

FOREIGN PATENT DOCUMENTS

| | | | |
|---|---|---|---|
| 0 362 619 A1 | 4/1990 | European Pat. Off. | |
| 63-3550 | 1/1988 | Japan | |
| 2 263 150 | 7/1993 | United Kingdom | |

Primary Examiner—Roger J. Schoeppel
Attorney, Agent, or Firm—Reid & Priest L.L.P.

[57] ABSTRACT

A pivoting member for rotatably supporting a pulley contacting a belt is pivotally fitted with a fixing shaft via a bushing while a frictional member including a slidable surface being at a right angle to the axis of the fixing shaft is forced, by an elastic force of a resilient member, into contact with a frictional surface disposed either on the pivoting member side or the fixing side, whereby a pivotal resistance is imparted to the pivoting member. The resilient member is disposed at least one place on the circumference of a circle whose center is the fixing shaft so as to inhibit the pivoting member from being inclined by a load from the belt while the frictional member is locally disposed correspondingly to the resilient member.

5 Claims, 4 Drawing Sheets

AUTO-TENSIONER

BACKGROUND OF THE INVENTION

The present invention relates to an auto-tensioner for imparting a predetermined tension to a belt wound about a pulley.

Conventionally an auto-tensioner has been utilized to maintain a constant tension of a belt wound about a plurality of driven shafts such as camshafts in an automotive vehicle.

There has been provided in the art an auto-tensioner wherein a pivoting member for rotatably supporting a pulley contacting a belt is forced into contact with a fixing side via a frictional member by means of a compressional resistance of an axially compressed helical torsion spring to cause a frictional resistance so that a vibrational energy of the belt may be absorbed (see, for example, Japanese Unexamined Utility Model Publication No.63-3550 (1988)).

FIG.8 is a sectional view for illustrating this type of auto-tensioner. In this auto-tensioner, a cylindrical pivoting member 92 with a side plate 92a at one end thereof is pivotally fitted around the outer periphery of a fixing shaft 91 mounted to a bed 90. The pivoting member 92 is eccentric to the fixing shaft 91 and axially movably fitted with the fixing shaft 91. A pulley 93 in rollable contact with an unillustrated belt is rotatably mounted to the outer periphery of the pivoting member 92 by means of a bearing mechanism 94. The pivoting member 92 contains therein a helical torsion spring 95. The helical torsion spring 95 has an end thereof locked to the pivoting member 92 with the other end thereof locked to the bed 90 side. The aforesaid helical torsion spring 95 is, as torsionally and compressionally deformed, interposed between the side plate 92a of the pivoting member 92 and a spring receiving member 96 on the fixing shaft 91 side. Interposed between the side plate 92a of the pivoting member 92 and the bed 90 is a frictional member 97 such as made of a synthetic resin. A bushing 98 is interposed between fitting surfaces of the fixing shaft 91 and the pivoting member 92. The bushing 98 is integrally formed with the frictional member 97.

According to the auto-tensioner of the above construction, the pivoting member 92 may be forced into contact with the bed 90 via the frictional member 97 by means of the compressional resistance of the helical torsion spring 95. This imparts a predetermined pivotal resistance to the pivoting member 92, thereby absorbing the vibrational energy of the belt. Further, the torsional resistance of the helical torsion spring 95 allows the pivoting member 92 to pivot about the fixing shaft 91 so as to press the belt with a predetermined pressure.

In the auto-tensioner of the above construction, the pivoting member 92 tends to incline relative to the axis of the fixing shaft 91 because of a load applied by the belt B. This may disadvantageously cause a significant inclination of the pulley 93, resulting in disengagement of the belt from the pulley 93 if the fixing shaft 91 and the pivoting member 92 are fitted with a low precision. Accordingly, the fixing shaft 91 and the pivoting member 92 must be machined with high precision to secure the fitting precision of the both. Hence, the machining of the fixing shaft 91 and the pivoting member 92 is cumbersome, resulting in higher fabrication costs.

In addition, the frictional member 97 is apt to wear particularly on a side thereof which receives the inclination of the pivoting member 92 while an offset load tends to affect the busing 98 interposed in a fitting portion between the fixing shaft 91 and the pivoting member 92, thereby local wear tends to occur. Accordingly, a need exists for the use of an expensive, highly wear-resistant super engineering plastic material such as polyether etherketone (PEEK), polyether sulfone (PES) or the like as the material for the frictional member 97 and the bushing 98. As a result, the auto-tensioner requires even higher fabrication costs.

OBJECT AND SUMMARY OF THE INVENTION

An object of the present invention is to provide an auto-tensioner excluding a need for fitting the pivoting member in the fixing shaft with high precision and reducing material costs for the bushing and the pivoting member, thereby reducing fabrication costs.

An auto-tensioner according to the invention for achieving the above object comprises:

a fixing shaft secured to a bed, a pulley in contact with a belt, a pivoting member pivotally fitted with the aforesaid fixing shaft by means of a bushing, thereby rotatably supporting the aforesaid pulley, a frictional member including a slidable surface being at a right angle to the axis of the aforesaid fixing shaft and being disposed locally around the aforesaid fixing shaft, and a resilient member corresponding to the aforesaid frictional member for forcing the frictional member into contact with a frictional surface disposed either on a pivoting member side or on a fixing side, thereby imparting a pivotal resistance to the pivoting member, wherein the aforesaid frictional member and resilient member are positioned so as to inhibit the pivoting member from being inclined by a load from the belt.

According to the auto-tensioner of the invention, the elastic force of the resilient member may inhibit the pivoting member from being inclined by a load from the belt. This eliminates the need for fitting the fixing shaft with the pivoting member with high precision. Further, the aforesaid load of the belt may be evenly imparted to the bushing interposed in a fitting portion between the fixing shaft and the pivoting member so that a pressure on the surface of the bushing may be decreased. This excludes the need for the use of an expensive, highly wear-resistant resin material for forming the bushing. Furthermore, the aforesaid frictional member is locally disposed so as to reduce the material cost thereof. Thus, the auto-tensioner may require less fabrication costs.

In carrying out our invention in one preferred mode, the auto-tensioner of the invention includes the resilient member which is formed of a resilient material and which has an end thereof serving also as the frictional member.

This mode does not require the frictional member to be constructed as an independent structure, and therefore the auto-tensioner may have a simple construction. Accordingly, the fabrication costs of the auto-tensioner may be further reduced.

In another preferred mode, the auto-tensioner of the invention is characterized by that the aforesaid frictional member and resilient member are disposed at one place on the circumference of a circle whose center is the fixing shaft.

According to this mode, the frictional member and the resilient member include a minimum number of components such that the auto-tensioner hereof has an even more simple construction.

In yet another preferred mode, the auto-tensioner hereof is characterized by that the frictional member and the resilient member are disposed at two places on the circumference of a circle whose center is the fixing shaft, which places are on a belt load point side and the opposite side thereto, or they are opposed each other across the fixing shaft and that an elastic force of the resilient member on the belt load point side is smaller than that of the resilient member on the opposite side to the belt load point.

According to this mode, a force corresponding to a difference between the elastic forces of the two resilient members may inhibit the pivoting member from being inclined by a load from the belt. Additionally, the two resilient members may be used to strongly press the frictional surface while a larger area may be provided where the frictional member is forced into contact with the frictional surface, whereby a more positive absorption of the vibrational energy of the belt may be attained.

In still another preferred mode, the auto-tensioner of the invention is characterized by that the aforesaid frictional member and resilient member are inserted into a hole defined in the pivoting member.

According to this mode, the auto-tensioner may have a compact construction. Further, the axial length of the auto-tensioner may be shorter than a case where the aforesaid frictional member and resilient member are mounted to the fixing shaft.

DETAILED DESCRIPTION OF THE PREFERRED EMBODIMENT

The present invention will be described in detail hereinbelow with reference to the attached drawings illustrating preferred embodiments thereof.

Figure 1:
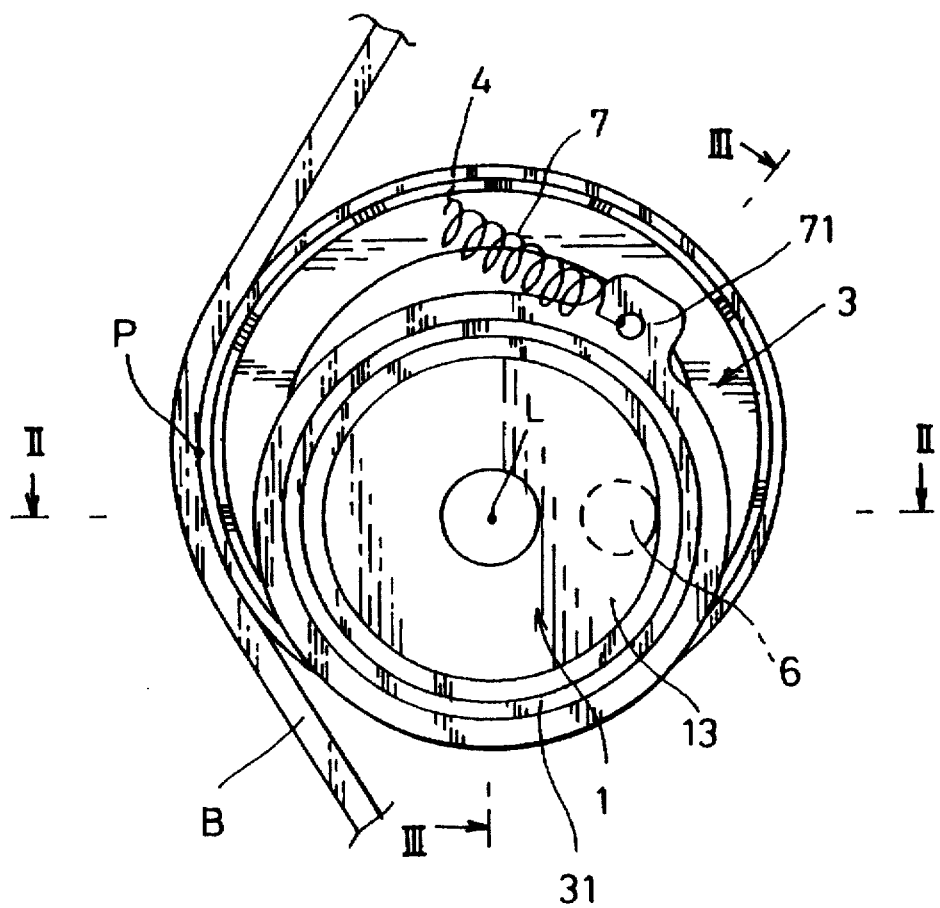
FIG.1 is a front view for illustrating an embodiment of an auto-tensioner in accordance with the invention.
Figure 2:
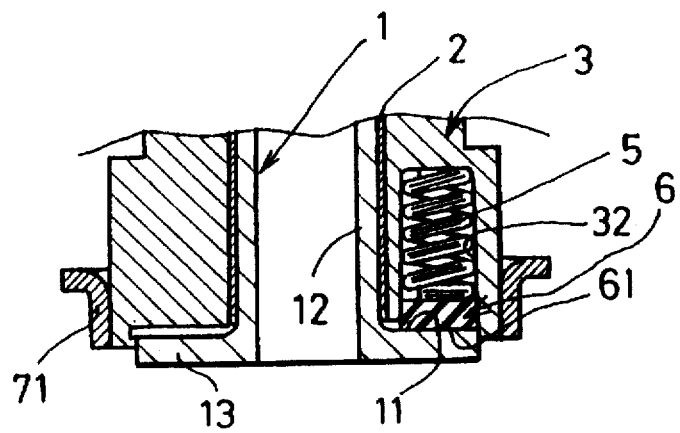
FIG.2 is a sectional view of the principal portion of FIG.1 taken on line II—II.
Figure 3:
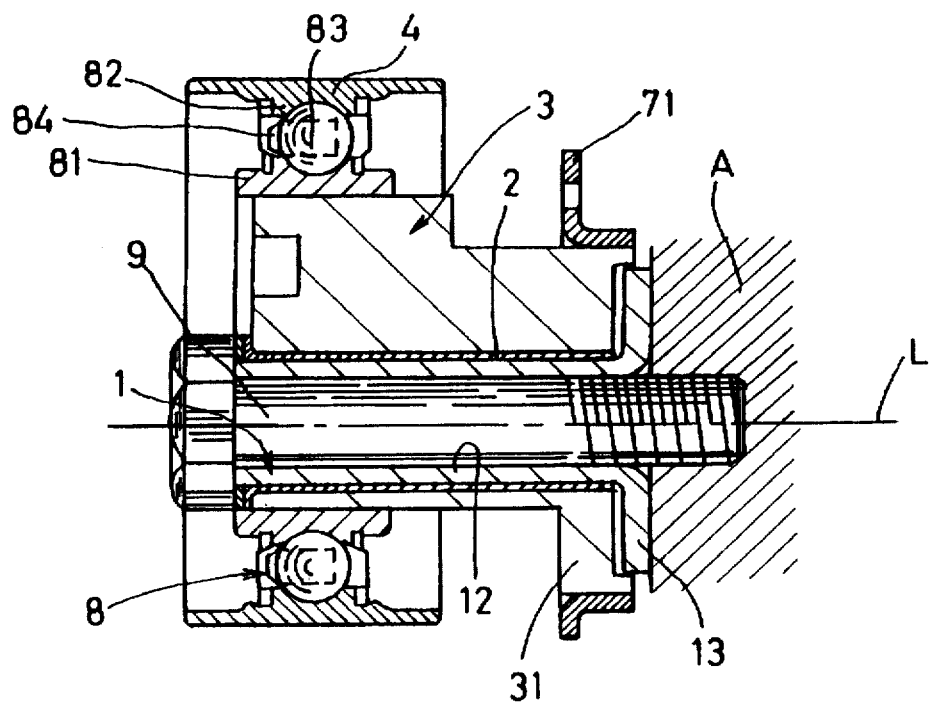
FIG.3 is a sectional view taken on line III—III of FIG. 1.

As shown in FIGS.1 through 3, the auto-tensioner of the present invention essentially comprises a fixing shaft 1 mounted to a bed A on a fixing side such as an engine, a pivoting member 3 pivotally fitted around the outer periphery of the fixing shaft 1 by means of a bushing 2, a pulley 4 rotatably mounted to the outer periphery of the pivoting member 3 by means of a bearing mechanism 8, a resilient member 5 comprised of a helical compression spring which is inserted into an end of the pivoting member 3, a frictional member 6 forced into contact with a frictional surface 11 on the fixing shaft 1 side by means of an elastic force of the resilient member 5, and a helical tension spring 7 for causing the pivoting member 3 to pivot about the fixing shaft 1 so as to press the pulley 4 against a belt B.

The aforesaid fixing shaft 1 includes a cylindrical shaft portion 12 which is formed with a flange portion 13 at an end thereof on the fixing side. One surface of the flange portion 13 constitutes the frictional surface 11 which is forced into contact with the frictional member 6. The fixing shaft 1 is secured to the bed A by a bolt 9 penetrating therethrough with the flange portion 13 set along the bed A. The fixing shaft 1 is formed, for example, by press-forming a pipe material. The bushing 2 fitted around the outer periphery of the fixing shaft 1 is formed of a synthetic resin such as nylon 46.

The pivoting member 3 is an eccentric cylindrical member such as formed of an aluminum die cast product. It is rotatably fitted with the fixing shaft 1 as decentered upward as seen in FIG.3. The pivoting member 3 is inhibited from moving away from the bed A by the head of the bolt 9. An end of the bed A side of the pivoting member 3 is formed with a cylinder portion 31 concentric with the axis L of the fixing shaft 1. The outer periphery of the cylinder portion 31 is press-fitted with an annular spring hook 71 for engaging the helical tension spring 7.

The bearing mechanism 8 comprises a plurality of balls 83 rollably interposed between an inner ring 81 press-fitted around the outer peripheral end of the pivoting member 3 and an outer ring 82 integrally formed with the inner periphery of the pulley 4. The respective balls 83 are retained as spaced in a retaining case 84 made of a synthetic resin.

The resilient member 5 is inserted into a hole 32 as resiliently contracted, which hole 32 is defined at the end of the bed A side of the pivoting member 3 (see FIG.2). The hole 32 extends in parallel with the axis L of the fixing shaft 1 and has an opening thereof facing the frictional surface 11 of the fixing shaft 1. The hole 32 is formed at a place opposite to a load point P of the belt B across the fixing shaft 1 and on the circumference of a circle whose center is the axis L of the fixing shaft 1 such that the elastic force of the resilient member 5 may inhibit the pivoting member 3 from being inclined by a load from the belt B.

The frictional member 6 is a disc-like member movably inserted into the hole 32 in the pivoting member 3. The frictional member 6 is formed of a super engineering plastic material having good wear-resistance such as PES, PEEK or the like. A slidable surface 61, which is an end surface of the frictional member 6, is forced into contact with the frictional surface 11 of the fixing shaft 1 as projecting from the hole 32 in the pivoting member 3. The aforesaid slidable surface 61 is crossed at a right angle to the axis L of the fixing shaft 1.

The aforesaid helical tension spring 7 for causing the pivotal movement of the pivoting member 3 is disposed between the spring hook 71 and a predetermined position of the bed A.

In the auto-tensioner having the above construction, the elastic force of the resilient member 5 may inhibit the pivoting member 3 from being inclined by a load from the belt relative to the axis L of the fixing shaft 1. This eliminates the need for fitting the pivoting member 3 with the fixing shaft 1 with high precision. Accordingly, the fitting portion between the fixing shaft 1 and the pivoting member 3 may be machined easily and less expensively. Additionally, the inclination of the pivoting member 3 is inhibited so as to allow a load of the belt B to be evenly applied to the bushing 2 interposed between the fixing shaft 1 and the pivoting member 3 and thus, a pressure on the surface of the bushing 2 may be decreased. This excludes the need for using an expensive, highly wear-resistant synthetic resin like the aforesaid super engineering plastics as the material for the bushing 2. Furthermore, the frictional member 6 is disposed at only one place around the fixing shaft 1, and therefore, an amount of the resin material thereof may be much smaller than a case where the frictional member is disposed on all the length around the fixing shaft 1. This reduces the material cost of the frictional member 6, thus contributing to reduced fabrication costs of the auto-tensioner.

In the above auto-tensioner, the frictional member 6 is pushed by the resilient member 5 and therefore, the frictional member 6 can maintain a forcible contact relationship with the slidable surface 11 even if the frictional member 6 is worn. Accordingly, instead of the aforesaid super engineering plastics, a less costly synthetic resin material such as polyurethane rubber may be used as the material of the frictional member 6.

In the aforementioned embodiment, the frictional member 6 and the resilient member 5 are inserted into the hole 32 defined in the pivoting member 3 so that the construction of the auto-tensioner may be more compact than a case where the frictional member 6 and the resilient member 5 are disposed at the outside of the outer periphery of the pivoting member 3. Also, the axial length of the auto-tensioner may be smaller than a case where the frictional member 6 and the resilient member fixing disposed on the fixing shaft 1.

Figure 4:
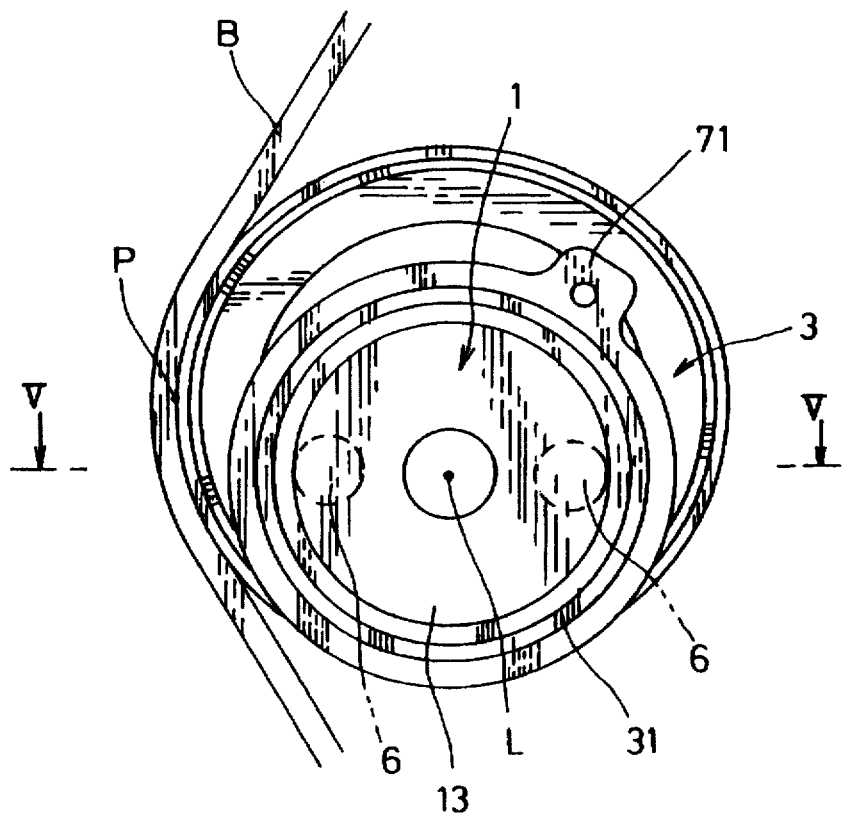
FIG.4 is a front view for illustrating another embodiment of the invention.
Figure 5:
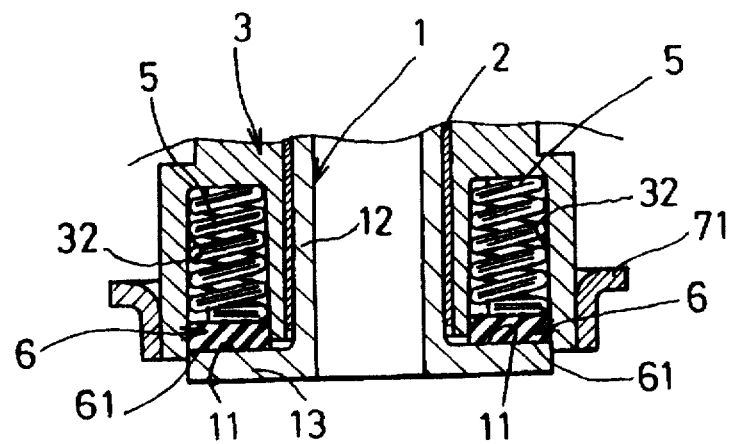
FIG.5 is a sectional view of the principal portion of FIG.4 taken on line V—V.

FIG.4 is a front view of another embodiment of the invention, whereas FIG. 5 is a sectional view of the principal portion thereof. This embodiment differs from the above embodiment in that the resilient member 5 is also disposed on the side of the load point P of the belt B.

In this embodiment, an end of the pivoting member 3 is formed with holes 32 for inserting the resilient member 5 at two places on the circumference of a circle whose center is the axis L of the fixing shaft 1. One of the holes 32 is defined at a place opposite to the load point P of the belt B across the fixing shaft 1, while the other hole 32 is defined on the aforesaid load point P side. The resilient member 5 which is resiliently contracted is inserted into each hole 32. The aforesaid disc-like frictional members 6 are interposed between the respective resilient members 5 and the frictional surface 11 of the fixing shaft 1. It is noted that an elastic force of the resilient member 5 on the load point P side is smaller than that of the other resilient member 5, whereby the pivoting member 3 is inhibited from being inclined by the load from the belt B.

According to this embodiment, the two resilient members 5 are used to strongly press the frictional surface 11 of the fixing shaft 1, and besides, a larger area may be attained where the frictional member 6 is forced into contact with the frictional surface 11. Thus, a more positive absorption of the vibrational energy of the belt B may be provided.

Figure 6:
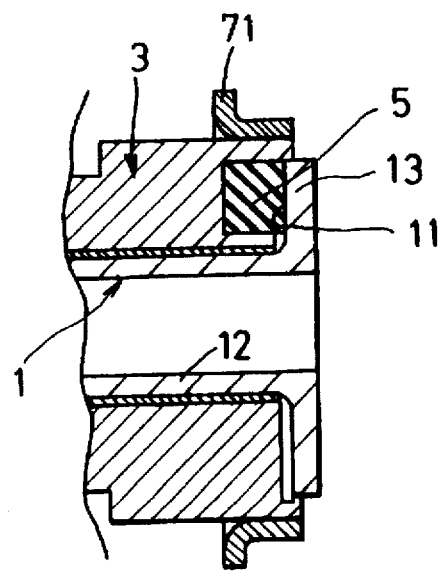
FIG.6 is a sectional view of the principal portion of yet another embodiment of the invention.

FIG.6 is a sectional view of the principal portion of yet another embodiment of the invention. In this embodiment, the aforesaid resilient member 5 comprises a pillar-like body of a resilient material such as polyurethane rubber or the like, in the place of the helical compression spring. As resiliently axially contracted, the resilient member has an end thereof forced into direct contact with the frictional surface 11.

According to this embodiment, the resilient member 5 has an end thereof serving also as the frictional member, so that the auto-tensioner has a simpler construction than a case where the frictional member is formed as an independent structure. This contributes to further reduced costs of the auto-tensioner.

Figure 7:
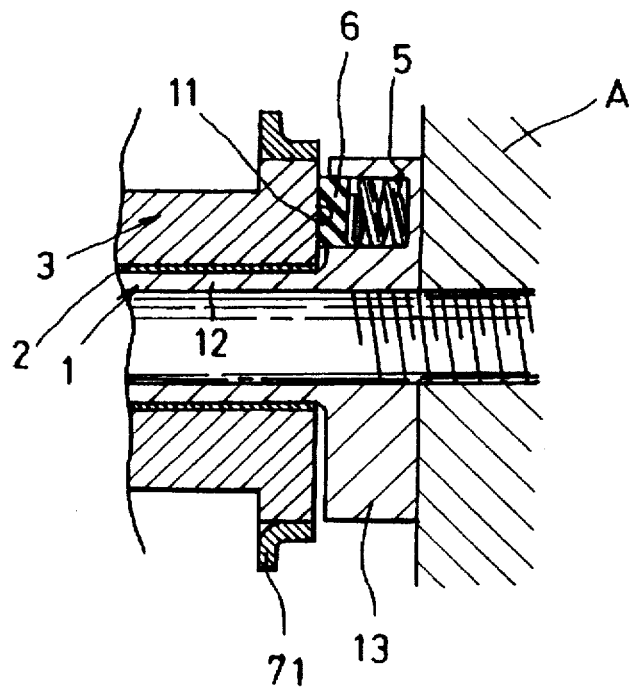
FIG.7 is a sectional view of the principal portion of still another embodiment of the invention.
Figure 8:
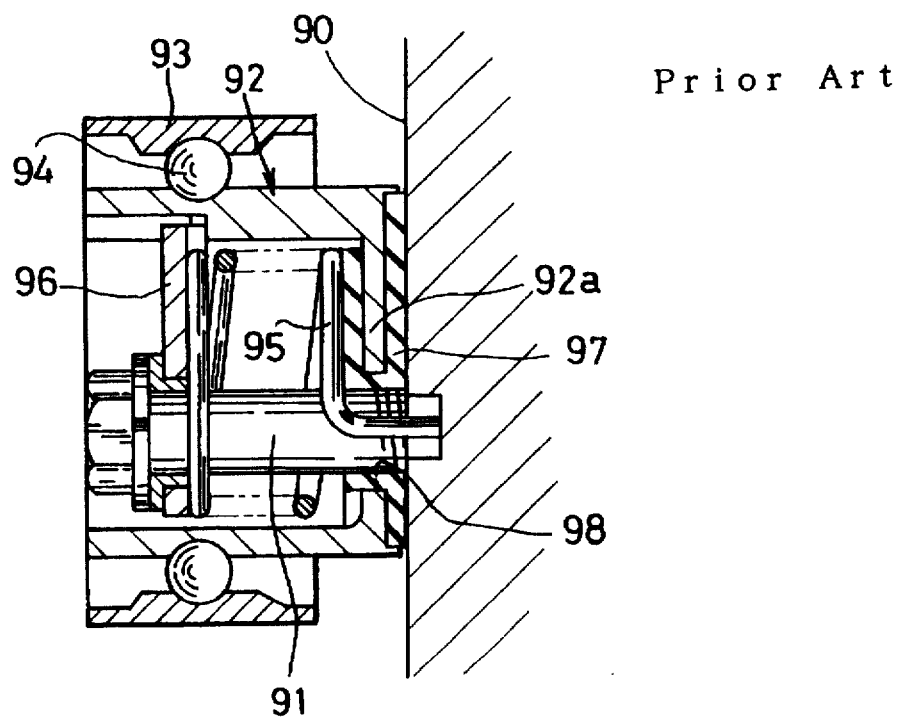
FIG.8 is a sectional view for illustrating the conventional example.

It is obvious to those skilled in the art that the auto-tensioner of the present invention is not limited to the above embodiments and various modifications thereof may be resorted to. For example, additional resilient members 5 and frictional members 6 may be provided; the resilient member 5, the frictional member 6 and the like may be disposed on the fixing shaft 1 side while the frictional surface 11 may be disposed on the pivoting member 3 side (see FIG.7); or the fixing shaft 1 and the bolt 9 may be formed as one piece.

The present invention may be practiced in various other forms without departing from the spirit or the principal characteristics thereof. The aforementioned embodiments are illustrated by way of mere example in every aspect and should not be construed as restrictive.

What is claimed is:

1. An auto-tensioner comprising:

a fixing shaft secured to a bed;

a pulley in contact with a belt;

a pivoting member pivotally fitted with said fixing shaft by means of a bushing, thereby rotatably supporting said pulley;

a frictional member including a slidable surface being at a right angle to the axis of said fixing shaft and disposed locally around said fixing shaft; and a resilient member corresponding to said frictional member for forcing the frictional member into contact with a frictional surface disposed either on the pivoting member side or the fixing side, thereby imparting a pivotal resistance to the pivoting member, wherein said frictional member and resilient member are positioned so as to inhibit the pivoting member from being inclined by a load from the belt and the fixing shaft is located within the pulley.

2. An auto-tensioner according to claim 1, wherein said resilient member is formed of a resilient material and has an end thereof serving also as said frictional member.

3. An auto-tensioner according to claim 1, wherein said frictional member and resilient member are disposed at one place on the circumference of a circle whose center is said fixing shaft.

4. An auto-tensioner according to claim 1, wherein said frictional member and resilient member are disposed at two places on the circumference of a circle whose center is said fixing shaft, which places are on a belt load point side and a side opposite thereto across said fixing shaft, and wherein an elastic force of said resilient member on the belt load point side is smaller than that of said resilient member on the opposite side to the belt load point.

5. An auto-tensioner according to claim 1 wherein said frictional member and resilient member are inserted into a hole defined in said pivoting member.

* * * * *